United States Patent
Miura

(10) Patent No.: US 9,414,425 B2
(45) Date of Patent: Aug. 9, 2016

(54) INFORMATION DISTRIBUTION SYSTEM, WIRELESS COMMUNICATION APPARATUS AND PROGRAM

(71) Applicant: ERi, Inc., Morioka-shi (JP)

(72) Inventor: Atsushi Miura, Morioka (JP)

(73) Assignee: ERI, INC., Morioka-shi (JP)

( * ) Notice: Subject to any disclaimer, the term of this patent is extended or adjusted under 35 U.S.C. 154(b) by 0 days.

(21) Appl. No.: 14/410,349

(22) PCT Filed: Jun. 28, 2013

(86) PCT No.: PCT/JP2013/067787
§ 371 (c)(1),
(2) Date: Dec. 22, 2014

(87) PCT Pub. No.: WO2014/017254
PCT Pub. Date: Jan. 30, 2014

(65) Prior Publication Data
US 2015/0327310 A1 Nov. 12, 2015

(30) Foreign Application Priority Data
Jul. 23, 2012 (JP) .................................. 2012-162878

(51) Int. Cl.
*H04W 76/02* (2009.01)
*H04W 8/00* (2009.01)
(Continued)

(52) U.S. Cl.
CPC ............ *H04W 76/023* (2013.01); *H04W 4/008* (2013.01); *H04W 8/005* (2013.01); *H04W 84/20* (2013.01); *H04W 76/02* (2013.01); *H04W 88/02* (2013.01)

(58) Field of Classification Search
CPC .................................................. H04W 8/005
USPC ................................ 455/41.1–41.3, 507, 517
See application file for complete search history.

(56) References Cited

U.S. PATENT DOCUMENTS 9,054,890 B2 * 6/2015 Tanizawa et al.
9,167,406 B2 * 10/2015 Nakayama
(Continued)

FOREIGN PATENT DOCUMENTS

CN 1618207 A 5/2005
EP 1 168 716 A2 1/2002
(Continued)

OTHER PUBLICATIONS

International Search Report for International Application No. PCT/JP2013/067787 dated Jul. 30, 2013.

*Primary Examiner* — Tuan H Nguyen
(74) *Attorney, Agent, or Firm* — Kratz, Quintos & Hanson, LLP

(57) ABSTRACT

An information distribution system and information distribution method which enable easy information distribution to an unspecified large number of parties by utilizing short range wireless communication are provided, that is, an information distribution system which utilizes a wireless communication system wherein a master side wireless communication apparatus and a slave side wireless communication apparatus start short range wireless communication in accordance with Bluetooth® protocols, the information distribution system has a first wireless communication apparatus 20 which is constituted as the master side wireless communication apparatus, and a second wireless communication apparatus 10 which is constituted as said slave side communication apparatus and which transmits a response signal (2) including distribution information not related to the establishment of connection with the master side wireless communication apparatus in a region for containing the information which is predetermined as the information required for the establishment of connection with the master side wireless communication apparatus when the second wireless communication apparatus receives the search signal (1) transmitted from the first wireless communication apparatus 20.

25 Claims, 18 Drawing Sheets

(51) Int. Cl.
 *H04W 4/00* (2009.01)
 *H04W 84/20* (2009.01)
 *H04W 88/02* (2009.01)

(56) References Cited

U.S. PATENT DOCUMENTS

2002/0002036 A1   1/2002   Uehara
2002/0037700 A1   3/2002   Dooley
2004/0092249 A1   5/2004   Sugikawa

FOREIGN PATENT DOCUMENTS

| | | |
|---|---|---|
| EP | 1 418 719 A1 | 5/2004 |
| JP | 2002-27526 A1 | 1/2002 |
| JP | 2004-509559 A1 | 3/2004 |
| JP | 2004-173260 A1 | 6/2004 |
| WO | WO 02/25873 A2 | 3/2002 |

* cited by examiner

FIG. 8

| IDENTIFIER | DISTRIBUTION INFORMATION |
|---|---|
| $a= | POSITION INFORMATION (STANDARD) |
| $b= | SENSOR INFORMATION |
| $c= | URL (http://www) |
| $d= | POSITION INFORMATION (DETAILED) |
| $e= | PUBLIC WiFi INFORMATION (SSID) |
| $f= | PUBLIC WiFi INFORMATION (PASSWORD) |
| $g= | SERVER ADDRESS |
| $h= | SERVER ADDRESS |
| $i= | EXISTENCE OF DYNAMIC UPDATE |
| $j= | EXISTENCE OF FOLLOWUP INFORMATION<br>0: NO FOLLOWUP INFORMATION<br>1: FOLLOWUP INFORMATION<br>0 TO 15: NUMBER OF PAGES<br>0 TO 15: TOTAL NUMBER OF PAGES |
| $k= | DATE AND TIME DATA |
| $l= | USER NAME |
| $m= | USER TELEPHONE NUMBER |
| $n= | USER SNS ACCOUNT INFORMATION |
| $o= | USER E-MAIL ADDRESS |
| $p= | PUBLIC KEY DATA |
| $q= | MESSAGE INFORMATION |
| . | . |
| . | . |
| . | . |

US 9,414,425 B2

INFORMATION DISTRIBUTION SYSTEM, WIRELESS COMMUNICATION APPARATUS AND PROGRAM

TECHNICAL FIELD

The present invention relates to an information distribution system which distributes information by short range wireless communication and to a wireless communication apparatus which is used for the information distribution system and a program for making a computer run processing in the wireless communication apparatus.

BACKGROUND ART

In the past, a system has been proposed which uses short range wireless communication based on Bluetooth® (below sometimes referred to as "BT") protocols to distribute various types of information (see PLT 1). In this system, a BT unit part which is mounted in a wireless mobile terminal transmits a search signal to find a nearby BT fixed station. Further, if there is a BT fixed station near the wireless mobile terminal, processing is performed for opening a communication link between the BT unit part and the BT fixed station by a predetermined protocol. If, due to this, a communication link is opened between the BT unit of the wireless mobile terminal and the BT fixed station and connection of these is established, after that, the BT fixed station uses short range communication based on BT protocols to transmit, for example, peripheral information (distribution information). When the BT unit part of the wireless mobile terminal receives the peripheral information which is transmitted from the BT fixed station, the peripheral information is utilized in the wireless mobile terminal.

CITATIONS LIST

Patent Literature

PLT 1: Japanese Patent Publication No. 2002-27526A

SUMMARY OF INVENTION

Technical Problem

In the system for distributing information such as explained above, each of the BT fixed station and the BT unit part of the wireless mobile terminal have to open a communication link and establish connection. Thus, to open a communication link and establish connection, information required for security (PIN codes, link keys, etc.) have to be sent and received. Due to this etc., the system is difficult to utilize as a system for distribution of information to an unspecified large number of parties.

The present invention was made in consideration of such a situation and provides an information distribution system which enables easy distribution of information toward an unspecified large number of parties by utilizing short range wireless communication and a wireless communication apparatus and program which are used for such an information distribution system.

Solution to Problem

The information distribution system according to the present invention is configured as an information distribution system utilizing a wireless communication system wherein a master side wireless communication apparatus and a slave side wireless communication apparatus start short range wireless communication in accordance with a procedure in which the master side wireless communication apparatus transmits a search signal, the slave side wireless communication apparatus performs a stand-by operation for a search signal, and the slave side wireless communication apparatus which receives the search signal transmits a response signal including information which is predetermined as information required for establishment of connection with the master side wireless communication apparatus to the master side wireless communication apparatus, the information distribution system has a first wireless communication apparatus which is constituted as the master side wireless communication apparatus; and a second wireless communication apparatus which is constituted as the slave side communication apparatus and which transmits a response signal including distribution information not related to the establishment of connection with said master side wireless communication apparatus in a region for containing the information which is predetermined as the information required for the establishment of connection with the master side wireless communication apparatus when the second wireless communication apparatus receives the search signal transmitted from the first wireless communication apparatus.

Due to such a configuration, after the first wireless communication apparatus constituted as the master side wireless communication apparatus transmits a search signal, a response signal including distribution information not related to the establishment of connection in a region of the response signal for containing the information which is predetermined as information required for the establishment of connection is transmitted from the second wireless communication apparatus which is constituted as the slave side wireless communication apparatus and which receives the search signal, and the first wireless communication apparatus which receives the response signal acquires the distribution information included in the response signal. Thus, due to the transmission and reception of the search signal and the transmission and reception of the response signal before the establishment of connection between the first wireless communication apparatus and the second wireless communication apparatus, the distribution information not related to the establishment of connection can be transmitted from the second wireless communication apparatus to the first wireless communication apparatus by the short range wireless communication.

The information distribution system according to the present invention can be configured so that the second wireless communication apparatus constituted as said slave side wireless communication apparatus transmits the response signal including identification information which is arranged with a predetermined relative positional relationship to the distribution information in the region of the response signal. In this case, it can be configured so that the first wireless communication apparatus constituted as said master side wireless communication apparatus detects the identification information from the received response signal and acquires information, as the distribution information, which is arranged with the predetermined relative positional relationship to the identification information in the response signal.

Due to such a configuration, the first wireless communication apparatus which receives the response signal can easily find the distribution information which is contained in the response signal based on the identification information.

Further, the information distribution system according to the present invention can be configured to use as the wireless communication system a wireless communication system which starts the short range wireless communication in accordance with Bluetooth® protocols.

Due to such a configuration, due to the transmission and reception of the search signal and the transmission and reception of the response signal before establishment of connection between the first wireless communication apparatus and the second wireless communication apparatus according to Bluetooth® protocols, the distribution information not related to the establishment of connection can be transmitted from second wireless communication apparatus constituted as the slave wireless communication apparatus to the first wireless communication apparatus constituted as the master side wireless communication apparatus.

In a case where as described above, a wireless communication system which starts the short range wireless communication in accordance with the Bluetooth® protocols is used as the wireless communication system, the second wireless communication apparatus constituted as the slave side wireless communication apparatus can be configured so as to transmit the response signal including the distribution information in the region for containing information relating to a device name which is predetermined as the information required for the establishment of connection with said master side wireless communication apparatus. Further, in this case, the first wireless communication apparatus constituted as the master side wireless communication apparatus can be configured so as to acquire the distribution information from the region of the response signal for containing the information which relates to the device name.

Due to such a configuration, the first wireless communication apparatus which receives the response signal can easily find the distribution information included in the response signal from a region in which a device name which is known in advance is contained.

Furthermore, the information distribution system according to the present invention can be configured so that after the first wireless communication apparatus receives the response signal, the establishment of connection between the first wireless communication apparatus constituted as the master side wireless communication apparatus and the second wireless communication apparatus constituted as the slave side wireless communication apparatus is not performed.

Due to such a configuration, after a response signal in which the distribution information is contained is received by the first wireless communication apparatus (master side wireless communication apparatus) and the objective of information distribution is achieved, processing is not performed for establishment of connection between the first wireless communication apparatus and the second wireless communication apparatus, so wasted operations after information distribution can be eliminated.

The wireless communication apparatus according to the present invention is configured as a wireless communication apparatus constituted as a slave side wireless communication apparatus in a wireless communication system wherein a master side wireless communication apparatus and the slave side wireless communication apparatus start short range wireless communication in accordance with a procedure in which the master side wireless communication apparatus transmits a search signal, the slave side wireless communication apparatus performs a stand-by operation for a search signal, and the slave side wireless communication apparatus which receives the search signal transmits a response signal including information which is predetermined as information required for establishment of connection with the master side wireless communication apparatus to the master side wireless communication apparatus, the wireless communication apparatus comprising: response signal setting means for preparing a response signal including distribution information not related to the establishment of connection with the master side wireless communication apparatus in a region for containing the information which is predetermined as the information required for the establishment of connection with the master side wireless communication apparatus when the search signal from the master side wireless communication apparatus is received by a receiving part, and response signal transmission control means for making a transmitting part transmit the response signal which is prepared by the response signal setting means.

Due to such a configuration, when a search signal from the master side wireless communication apparatus is received by the receiving part before the establishment of connection with the master side wireless communication apparatus, the response signal which includes distribution information not related to the establishment of connection in the region of the response signal for containing information which is predetermined as information which is required for the establishment of connection is prepared and transmitted from the transmitting part. Due to this, the master side wireless communication apparatus which transmitted the search signal can acquire distribution information not related to establishment of connection which is contained in the response signal if the response signal is received.

The response signal setting means which prepares a response signal containing the distribution information may prepare a response signal which is generated each time a response signal which includes distribution information not related to establishment of connection in a region of the response signal for containing information which is predetermined as information which is required for establishment of connection is newly generated, as the response signal to be transmitted by the transmitting part, or may prepare a response signal which includes the distribution information stored in advance in a storage part as the response signal to be transmitted by the transmitting part.

The wireless communication apparatus according to the present invention can be configured so that the response signal setting means prepares the response information including identification information which is arranged with a predetermined relative positional relationship to the distribution information in the region of the response signal.

Due to such a configuration, the master side wireless communication apparatus which receives the response signal can easily find the distribution information from the response signal based on the identification information.

Further, the wireless communication apparatus according to the present invention can be configured to start the short range wireless communication with said master side wireless communication apparatus in accordance with Bluetooth® protocols.

In the above case, it may be configured so that the response signal setting means prepares the response signal including the distribution information in the region for containing information relating to a device name which is predetermined as the information required for the establishment of connection with the master side wireless communication apparatus.

Due to such a configuration, the master side wireless communication apparatus which receives the response signal can easily find the distribution information included in the response signal from a region in which a device name which is known in advance is contained.

Further, the wireless communication apparatus according to the present invention can be configured so as not to perform the establishment of connection with the master side wireless communication apparatus after the response signal is transmitted by the transmitting part.

Due to such a configuration, after a response signal in which the distribution information is contained is transmitted by the master side wireless communication apparatus and the objective of information distribution is achieved, processing is not performed for establishment of connection with the master side wireless communication apparatus, so wasted operations after information distribution can be eliminated.

The wireless communication apparatus according to the present invention is configured as a wireless communication apparatus constituted as a master side wireless communication apparatus in a wireless communication system wherein the master side wireless communication apparatus and a slave side wireless communication apparatus start short range wireless communication in accordance with a procedure in which the master side wireless communication apparatus transmits a search signal, the slave side wireless communication apparatus performs a stand-by operation for a search signal, and the slave side wireless communication apparatus which receives the search signal transmits a response signal including information which is predetermined as information required for establishment of connection with the master side wireless communication apparatus to the master side wireless communication apparatus, the wireless communication apparatus comprising: distribution information acquiring means for acquiring distribution information not related to the establishment of connection with the slave side wireless communication apparatus from a region of the response signal for containing information which is predetermined as the information required for the establishment of the connection with the slave side wireless communication apparatus when a transmitting part transmits the search signal, then a receiving part receives the response signal.

Due to such a configuration, when the response signal including distribution information not related to the establishment of connection in the region of the response signal for containing information which is predetermined as information required for establishment of connection is transmitted from the slave side wireless communication apparatus before the establishment of connection with the slave side wireless communication apparatus and after the search signal is transmitted by the transmitting part, the distribution information not related to establishment of connection can be acquired from the response signal which was received by the receiving part.

The wireless communication apparatus according to the present invention can be configured so that the response signal includes identification information which is arranged with a predetermined relative positional relationship to the distribution information in the region, and the distribution information acquiring means detects the identification information from the response signal and acquires information, as the distribution information, which is arranged with the predetermined relative positional relationship to the identification information in the response signal.

Due to such a configuration, it is possible to easily find the distribution information from the received response signal based on the identification information.

Further, the wireless communication apparatus according to the present invention can be configured so as to start the short range wireless communication with said slave side wireless communication apparatus in accordance with Bluetooth® protocols.

In the above case, the apparatus can be configured so that the response signal includes the distribution information in a region for containing information which relates to a device name which is predetermined as information required for the establishment of connection with the master side wireless communication apparatus, and the distribution information acquiring means acquires the distribution information from the region of the response signal for containing the information which relates to the device name.

Due to such a configuration, it is possible to easily find the distribution information included in the received response signal from a region in which a device name which is known in advance is contained.

Furthermore, the wireless communication apparatus according to the present invention can be configured so that after the response signal is received by the receiving part, the establishment of connection with the slave side wireless communication apparatus is not performed.

Due to such a configuration, after a response signal in which the distribution information is contained is received by the receiving part and the objective of information distribution is achieved, processing is not performed for establishment of connection with the slave side wireless communication apparatus, so wasted operations after information distribution can be eliminated.

The program according to the present invention is configured as a program for making a computer perform processing in a wireless communication apparatus constituted as a slave side wireless communication apparatus in a wireless communication system wherein a master side wireless communication apparatus and the slave side wireless communication apparatus start short range wireless communication in accordance with a procedure in which the master side wireless communication apparatus transmits a search signal, the slave side wireless communication apparatus performs a stand-by operation for a search signal, and the slave side wireless communication apparatus which receives the search signal transmits a response signal including information which is predetermined as information required for establishment of connection with the master side wireless communication apparatus to the master side wireless communication apparatus, the program making the computer perform a response signal setting step of preparing a response signal including distribution information not related to the establishment of connection with the master side wireless communication apparatus in a region for containing the information which is predetermined as the information required for the establishment of the connection with the master side wireless communication apparatus when the search signal from the master side wireless communication apparatus is received by a receiving part, and a response signal transmission control step of making a transmitting part transmit the response signal which is prepared by the response signal setting step.

Further, another program according to the present invention is configured as a program for making a computer perform processing in a wireless communication apparatus constituted as a master side wireless communication apparatus in a wireless communication system wherein the master side wireless communication apparatus and a slave side wireless communication apparatus start short range wireless communication in accordance with a procedure in which the master side wireless communication apparatus transmits a search signal, the slave side wireless communication apparatus performs a stand-by operation for a search signal, and the slave side wireless communication apparatus which receives the search signal transmits a response signal including information which is predetermined as information required for establishment of connection with the master side wireless communication apparatus to the master side wireless communication apparatus, the program making the computer perform a distribution information acquiring step of acquiring distribution information not related to the establishment of connection with the slave side wireless communication apparatus from a region of the response signal for containing information which is predetermined as the information required for the establishment of the connection with the slave side wireless communication apparatus when a transmitting part transmits the search signal, then a receiving part receives the response signal.

Advantageous Effects of Invention

According to the information distribution system according to the present invention, due to the transmission and reception of the search signal and the transmission and reception of the response signal before establishment of connection between the first wireless communication apparatus and the second wireless communication apparatus, distribution information not related to establishment of connection can be transmitted from second wireless communication apparatus to the first wireless communication apparatus by short range wireless communication, so information distribution toward an unspecified large number of parties by utilizing short range wireless communication becomes easy. The information distribution system according to the present invention specifically, for example, can be easily realized by utilizing a wireless communication system which starts short range wireless communication by Bluetooth® protocols.

Further, according to the wireless communication apparatus and program according to the present invention, it is possible to realize the above information distribution system.

BRIEF DESCRIPTION OF DRAWINGS

FIG. 8 is a table which shows one example of the relationship between distribution information and identification information (tags) which are included in the response signal.

DESCRIPTION OF EMBODIMENTS

Below, embodiments of the present invention will be explained using the figures.

Figure 1:
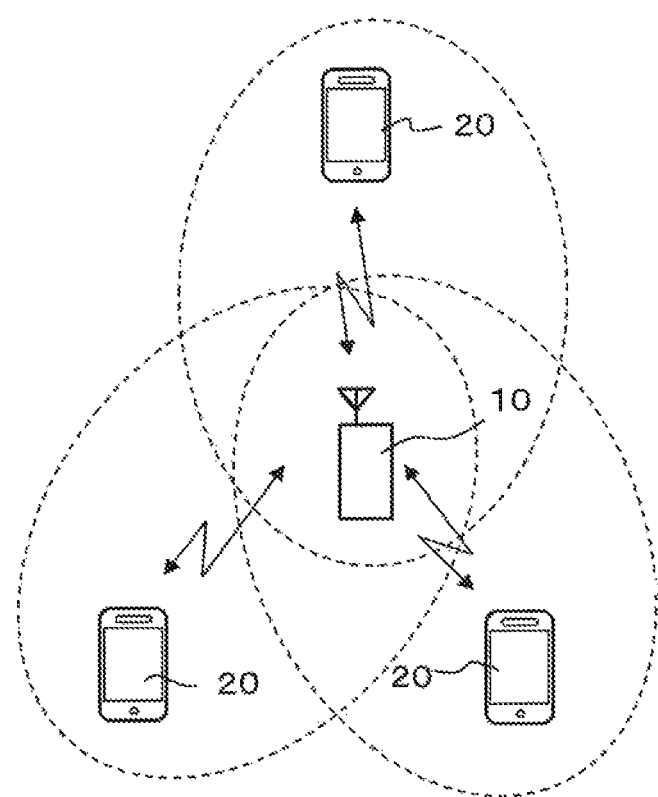
FIG. 1 is a view which shows the basic configuration of an information distribution system according to an embodiment of the present invention.

The information distribution system according to an embodiment of the present invention is configured such as shown in FIG. 1.

In FIG. 1, the information distribution system is configured so that information is distributed from an information distribution fixed station 10 which is installed in a building, in a station, or at an underground mall to mobile information terminals (for example, Smartphones) 20. This information distribution system utilizes a wireless communication system which starts short range communication in accordance with Bluetooth® protocols. The information distribution fixed station 10 functions as a slave side wireless communication apparatus, while the mobile information terminals 20 function as master side wireless communication apparatuses.

Figure 2:
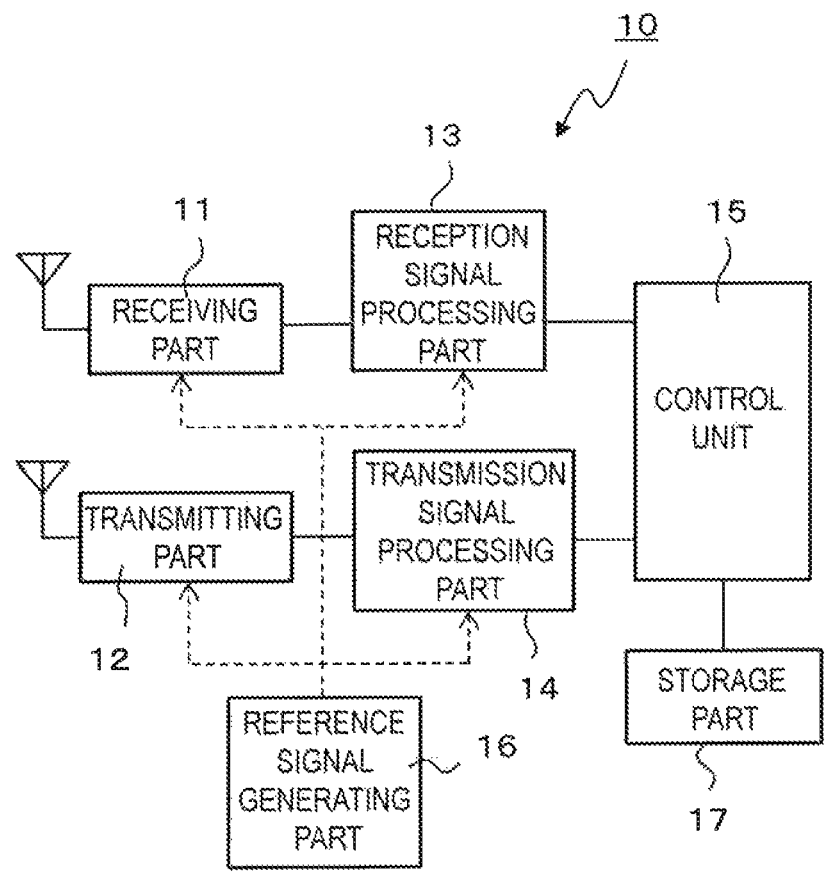
FIG. 2 is a block diagram which shows an example of the configuration of an information distribution fixed station (second wireless communication apparatus) in the information distribution system which is shown in FIG. 1.

The information distribution fixed station 10 which distributes information is, for example, configured as shown in FIG. 2.

In FIG. 2, the information distribution fixed station 10 has a receiving part 11, a reception signal processing part 13, a transmitting part 12, a transmission signal processing part 14, a control unit 15, a reference signal generating part 16, and a storage part 17. The receiving part 11 and the reception signal processing part 13 operate in synchronization with the reference signal which is generated by the reference signal generating part 16. The receiving part 11 receives a signal transmitted in accordance with Bluetooth® protocols and demodulates it to generate a reception signal. The reception signal processing part 13 decodes and otherwise processes the reception signal from the receiving part 11 and supplies the thus obtained information as reception data to the control unit 15. The control unit 15 is comprised of a computer which includes a CPU and runs various types of processing in accordance with programs which are stored in the storage part 17.

The transmission signal processing part 14 and the transmitting part 12 operate in synchronization with the reference signal which is generated by the reference signal generating part 16. The transmission signal processing part 14 encodes and otherwise processes the information which is received from the control unit 15 and is to be transmitted so as to generate the transmission signal, then the transmitting part 12 modulates and transmits the transmission signal from the transmission signal processing part 14 in accordance with Bluetooth® standards.

The storage part 17 stores various types of information to be included in the response signal which is transmitted when receiving a search signal from the master side wireless communication apparatus. Note that, the information to be included in the response signal will be explained later.

Figure 3:
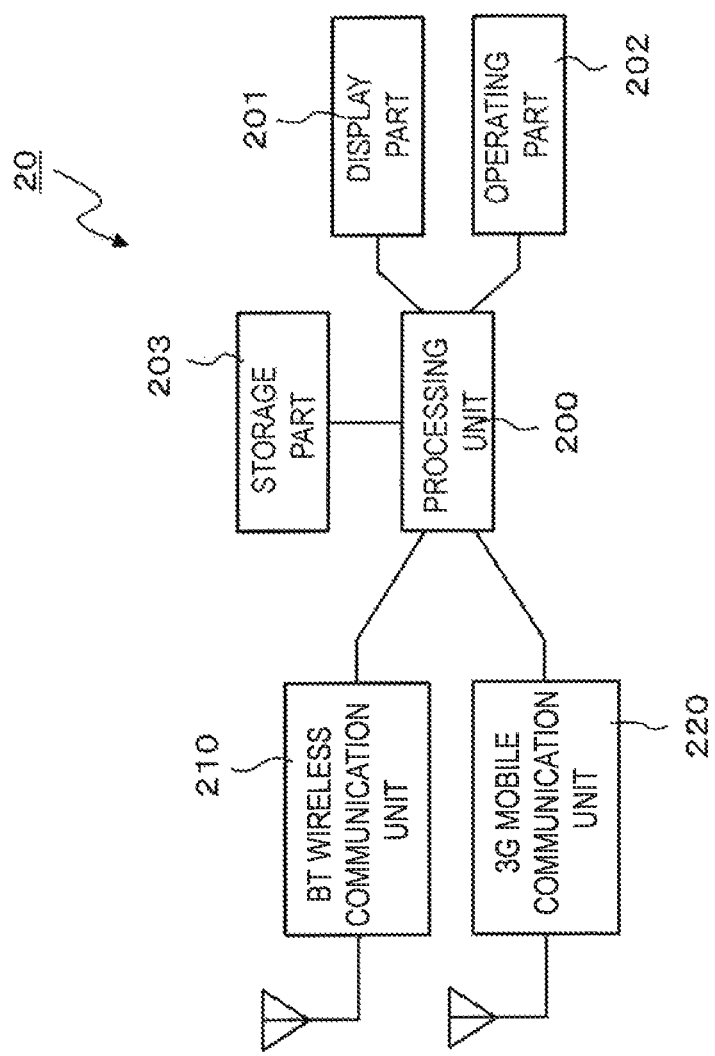
FIG. 3 is a block diagram which shows an example of the configuration of a mobile information terminal (first wireless communication apparatus) in the information distribution system which is shown in FIG. 1.

The mobile information terminal (for example, Smartphone) 20 which receives the distribution of information is, for example, configured as shown in FIG. 3.

In FIG. 3, this mobile information terminal 20 has a processing unit 200, a BT wireless communication unit 210, a 3G mobile communication unit 220, a display unit 201, an operating unit 202, and a storage part 203. The processing unit 200 is comprised of a computer which includes a CPU and runs various types of processing in accordance with programs which are stored in the storage part 203. The BT wireless communication unit 210 has a receiving part and a transmitting part etc. and transmits and receives information (signals) under the control of the processing unit 200 in accordance with Bluetooth® protocols. The 3G wireless communication unit 220 transmits and receives voice and data under the control of the processing unit 200 through a 3G mobile communication network.

The processing unit 200 runs various types of processing in accordance with operations at the operating unit 202. Further, the processing unit 200 can make the various types of information obtained by processing be displayed at the display unit 201. The storage part 203 stores not only the above-mentioned programs, but also information which is used for processing in the processing unit 200 or various information which is obtained as a result of processing.

Figure 4:
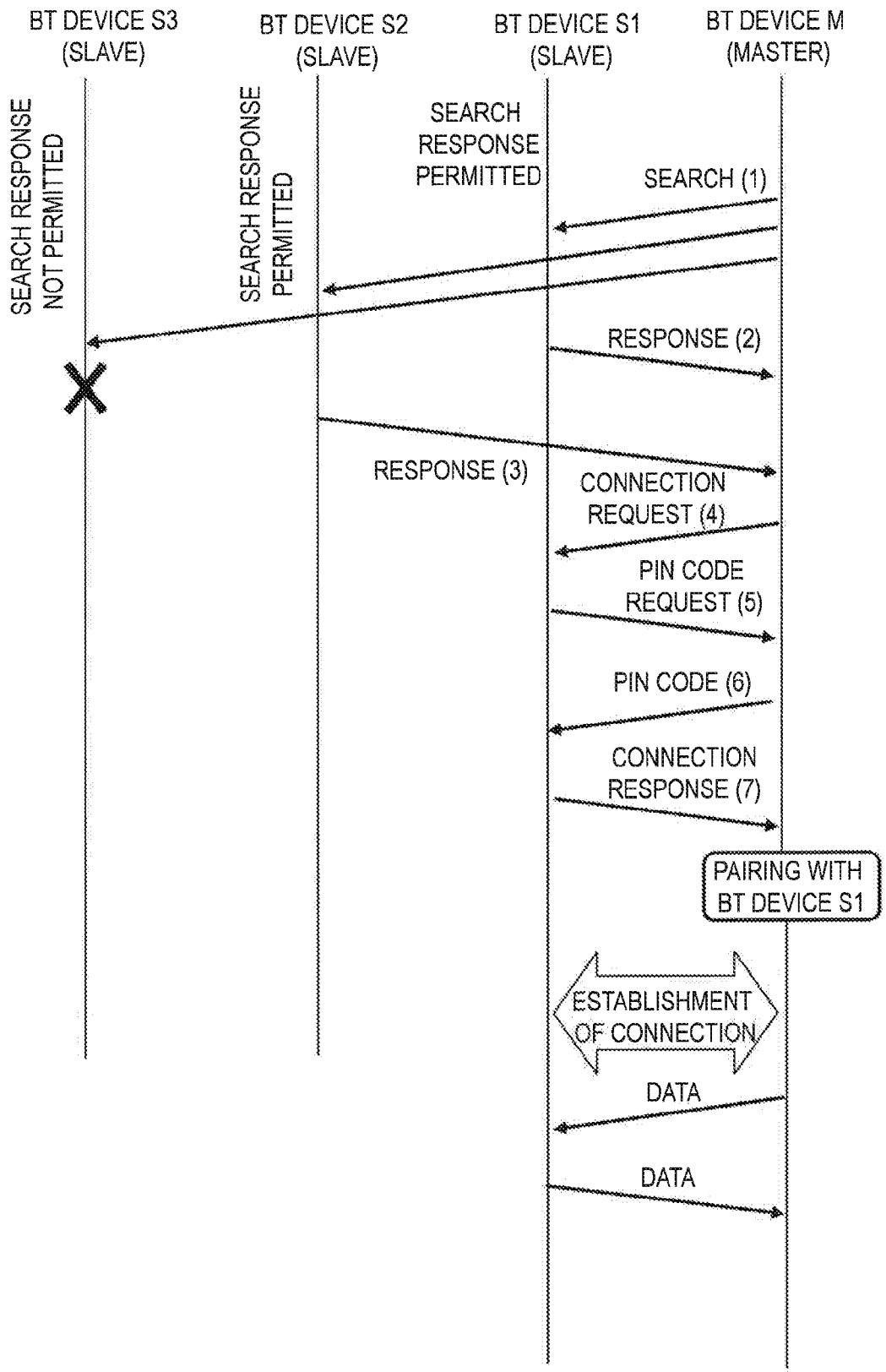
FIG. 4 is a sequence diagram which shows a general communication routine based on Bluetooth® protocols which is performed between a master side wireless communication apparatus and a slave side wireless communication apparatus.

In this regard, the general communication routine which is performed between a master side wireless communication apparatus and a slave side wireless communication apparatuses in accordance with Bluetooth® protocols is as shown in FIG. 4.

In FIG. 4, a BT master side device M (master side wireless communication apparatus) transmits a search signal to the surroundings (routine 1). If there are BT slave side devices S1, S2, and S3 (slave side wireless communication apparatuses) which are in states standing by for a search signal near the BT master side device M, for example, the two BT slave side devices S1 and S2 which can respond to the search signal transmit response signals to the BT master side device M (routine 2 and routine 3). Each response signal contains predetermined information which is predetermined as information which is required for establishment of connection with the BT master side device M, for example, the "device name" and "address information" of the BT slave side device S1 (S2). Note that, the BT slave side device S3 which cannot reply to the search signal does not transmit a response signal to the search signal.

When the BT master side device M receives a response signal, it identifies the BT slave side device (for example, S1) to be connected with based on information required for establishment of connection with the BT slave side device (including device name and address information) and transmits a connection request signal addressed to that BT slave side device S1 (routine 4). The BT slave side device S1 which transmits the response signal (routine 2), then receives the connection request signal (routine 4) transmits a signal requesting a PIN code (personal identification number) required for authentication with the BT master side device M to the BT master side device M (routine 5). This being so, the BT master side device M transmits a unique PIN code to the BT slave side device S1 (routine 6), then the BT slave side device S1 which receives that PIN code transmits a connection response signal to the BT master side device M (routine 7). If the BT master side device M receives the connection response signal (routine 7) for the connection request signal (routine 4), it confirms the sender of the connection request signal, that is, the BT slave device S1 which transmitted the connection response signal as the connecting party (pairing). After that, the BT master side device M and the BT slave side device S1 establish connection, and the BT master side device M and the BT slave device S1 transfer data between them by the short range communication.

Figure 5:
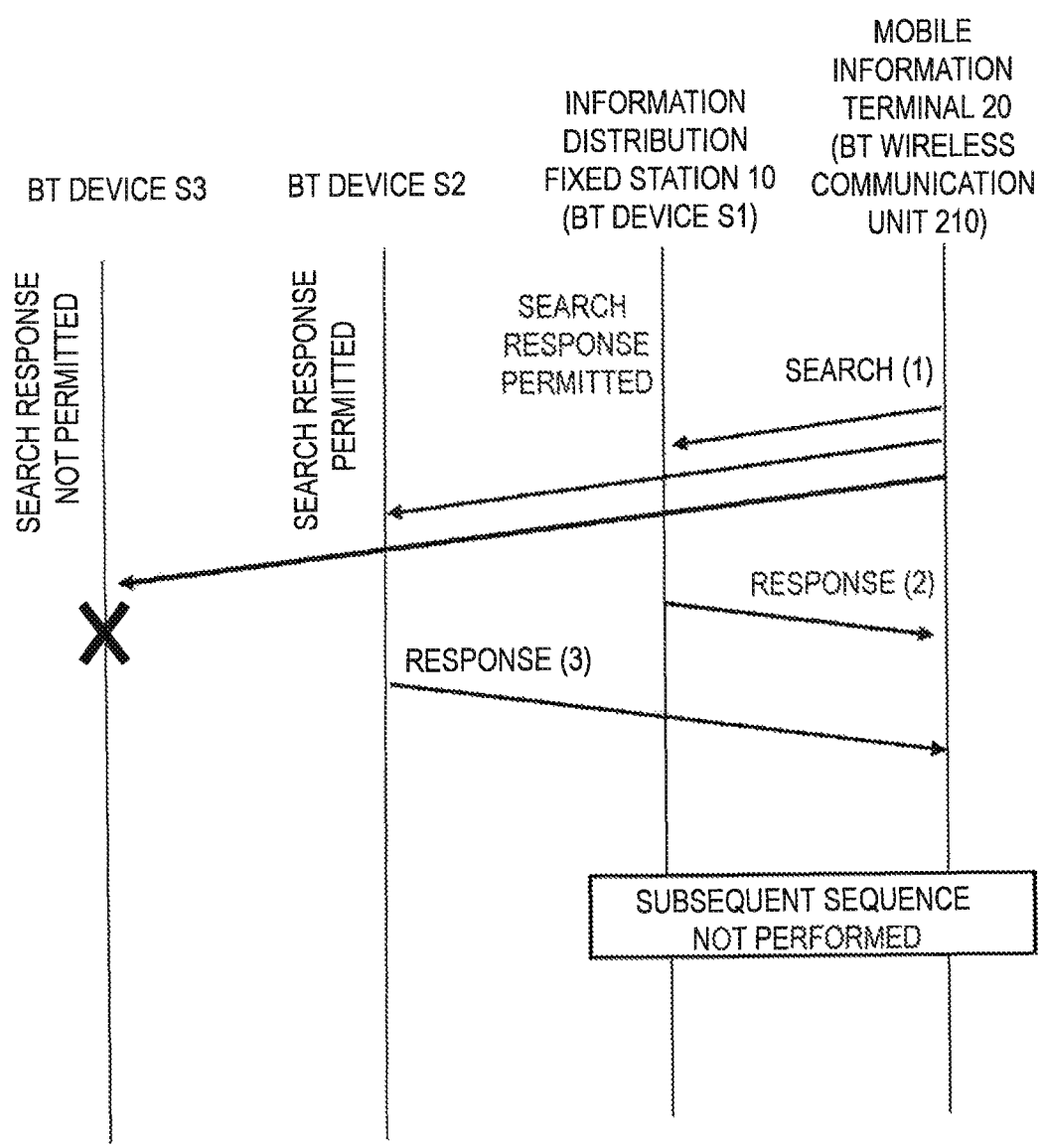
FIG. 5 is a sequence diagram which shows a communication routine which is performed between an information distribution fixed station and mobile information terminals in the information distribution system which is shown in FIG. 1.
Figure 9:
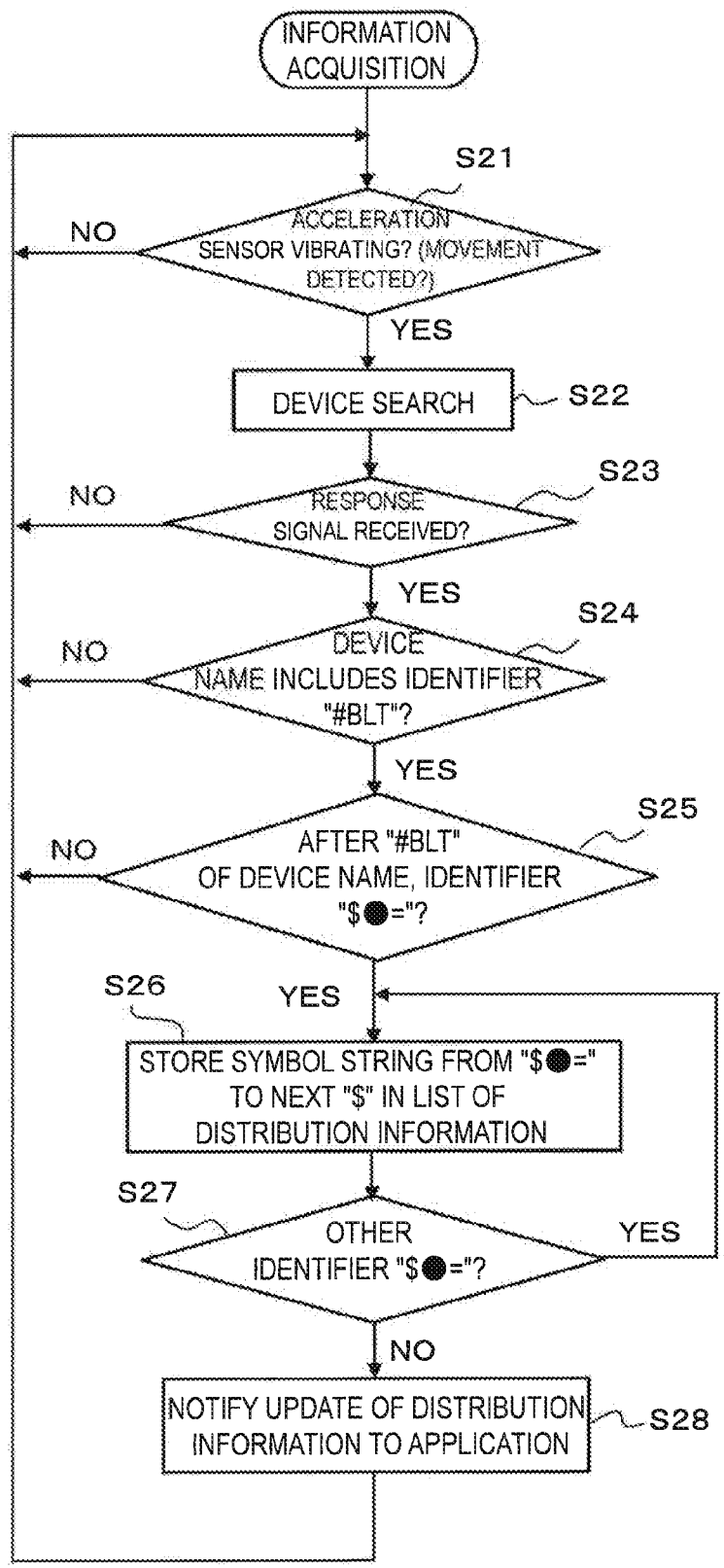
FIG. 9 is a flow chart which shows a routine for processing which is performed by a mobile information terminal (first wireless communication apparatus: master side wireless communication apparatus) in the communication routine which is shown in FIG. 5.

In the information distribution system which is shown in FIG. 1, the mobile information terminals 20 (BT wireless communication units 210) constituted as the master side wireless communication apparatuses and the information distribution fixed station 10 constituted as the slave side wireless communication apparatus start short range communication between them in accordance with the above-mentioned Bluetooth® protocols. Further, in the short range communications, distribution information is sent from the information distribution fixed station 10 to the mobile information terminals 20 (BT wireless communication units 210). Specifically, these mobile information terminals 20 (BT wireless communication units 210) and information distribution fixed station 10 transfer information between them in accordance with the communication routine which is shown in FIG. 5. At that time, the control unit 15 of the information distribution fixed station 10 runs processing relating to information distribution in accordance with the routine which is shown in FIG. 6, while the processing units 200 of the mobile information terminals 20 run processing relating to information acquisition in accordance with the routine which is shown in FIG. 9.

In FIG. 5, for example, a mobile information terminal 20 (BT wireless communication unit 210) which is held by a person moving inside of a building transmits a search signal (routine 1). An information distribution fixed station 10 which is installed in the building is in a state standing by for a search signal. Its control unit 15 (see FIG. 2) judges if the receiving part 11 has received a search signal (FIG. 6, S11). When the mobile information terminal 20 moves to near the information distribution fixed station 10 and the control unit 15 judges that the information distribution fixed station 10 (receiving part 11) has received a search signal (FIG. 6, S11, YES), a response signal including the distribution information is transmitted in accordance with the later explained routine from the information distribution fixed station 10 toward the mobile information terminal 20 (BT wireless communication unit 210) (routine 2). Note that, at this time, in the same way as the communication routine which is shown in FIG. 4, another BT slave side device S2 which is near the mobile information terminal 20 transmits a response signal (routine 3), while a BT slave side device S3 which even though near the mobile information terminal 20, cannot respond to the search signal does not transmit a response signal to the search signal. When the mobile information terminal 20 (BT wireless communication unit 210) constituted as the master side wireless communication apparatus receives a response signal including the distribution information, unlike the case of a general communication routine according to Bluetooth® protocols which is shown in FIG. 4, it does not transmit a connection request signal. As a result, the mobile information terminal 20 (master side wireless communication apparatus) and the information distribution fixed station 10 (slave side wireless communication apparatus) do not establish a connection. While the state where the mobile information terminal. 20 is near the information distribution fixed station 10 is maintained, the mobile information terminal 20 and the information distribution fixed station 10 can repeatedly transmit and receive a search signal, and transmit and receive a response signal in accordance with the above-mentioned routines 1 and 2.

Figure 6:
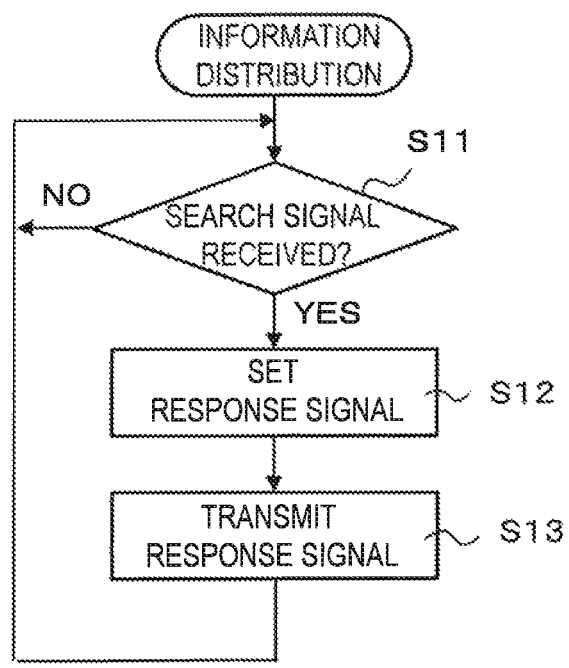
FIG. 6 is a flow chart which shows a routine of the processing which is performed by the information distribution fixed station (second wireless communication apparatus: slave side wireless communication apparatus) in the communication routine which is shown in FIG. 5.

The control unit 15 of the information distribution fixed station 10 performs processing relating to information distribution in accordance with the routine which is shown in FIG. 6 when performing short range communication with the mobile information terminal 20 in accordance with the above-mentioned communication routine (see FIG. 5).

In FIG. 6, if the control unit 15 (information distribution fixed station 10) judges that as explained above, the receiving part 11 has received a search signal (S11, YES: see FIG. 5, routine 1), it uses information which is stored in the storage part 17 to be distributed (distribution information) to prepare (set) the response signal including distribution information not related to the establishment of connection in the region of the response signal for containing information required for establishment of connection with the master side wireless device, that is, the "device name" (S12: response signal setting means). Further, the control unit 15 performs control so that a prepared (set) response signal is processed in the transmission signal processing part 14 and then transmitted from the transmitting part 12 to the mobile information terminal 20 (BT wireless communication unit 210) (S13: response signal transmission control means: see FIG. 5, routine 2). After that, each time the information distribution fixed station 10 receives a search signal from the mobile information terminal 20 (S11, YES), it transmits a response signal including the distribution information to the mobile information terminal 20 (S12 and S13).

Figure 7:
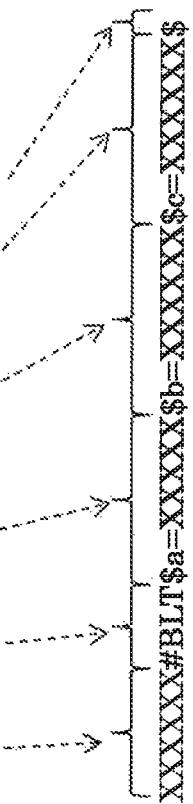
FIG. 7 is a view which shows an example of the format of a response signal including distribution information.

The response signal which the information distribution fixed station 10 sets and transmits is for example configured as shown in FIG. 7.

In FIG. 7, the response signal is comprised of the name of the device which is required for establishment of connection (name of the information distribution fixed station 10), an identifier "#BLT" which indicates the start of distribution information, position information following the identifier "$a=", sensor information following the identifier "$b=" (temperature and other information detected by a sensor), a URL following the identifier "$c=", and an identifier "$" which indicates the end of distribution information. That is, the response signal can include in the region for containing the "device name" necessary for establishment of connection with the master side wireless communication apparatus not only the device name, but also information not related to the establishment of connection, for example, position information indicating the position of installation of the information distribution fixed station 10, temperature information which is detected by a temperature sensor, and a URL indicating the address of the source of information on the Internet as distribution information. The distribution information which can be included in the response signal is not limited to the above and can be freely determined. For example, as shown in FIG. 8, as explained above, in addition to the position information corresponding to the identifier "$a=", sensor information corresponding to the identifier "$b=", and URL corresponding to the identifier "$c=", furthermore detailed position information corresponding to the identifier "$d=", public WiFi information (SSID) corresponding to the identifier "$e=", public WiFi information (password) corresponding to the identifier "$f=", server address corresponding to the identifier "$g=", other server address corresponding to the identifier "$h=", information indicating the existence of any dynamic change in the distribution information corresponding to the identifier "$i=", information indicating the existence of followup information corresponding to the identifier "$j=", time and date data corresponding to the identifier "$k=", user name corresponding to the identifier "$l=", user telephone number corresponding to the identifier "$m=", user SNS account information corresponding to the identifier "$n=", user e-mail address corresponding to identifier "$o=", public key data corresponding to identifier "$p=", and message information corresponding to identifier "$q=" can be included in the response signal as distribution information not related to establishment of connection.

On the other hand, the processing unit 200 of the mobile information terminal 20 performs processing relating to information acquisition according to the routine which is shown in FIG. 9 when being engaged in short range communication with the information distribution fixed station 10 in accordance with the above-mentioned communication routine (see FIG. 5).

In FIG. 9, the processing unit 200 uses a signal from an acceleration sensor (not shown) as the basis to confirm if a mobile information terminal 20 is in a moving state (S21, YES) while making the BT wireless communication unit 210 (transmitting part) transmit a device search signal in accordance with Bluetooth® protocols (S22: see FIG. 5, routine 1) and repeatedly judges if a response signal to that search signal is received by the BT wireless communication unit 210 (receiving part) (S23). In this state, if the BT wireless communication unit 210 (receiving part) receives a response signal including distribution information (see FIG. 7 and FIG. 8) from the information distribution fixed station 10 (S23, YES: see FIG. 5, routine 2), the processing unit 200 runs a search through the symbol string in the region of "device name" of the received response signal set as information required for establishment of connection with the slave side wireless communication apparatus (information distribution fixed station 10) from the head symbol and judges if there is an identifier of the symbol string "#BLT" (S24). If there is that identifier "#BLT" in the region of "device name" of the received response signal (S24, YES), the processing unit 200 judges if there is an identifier of the symbol string "$⬤=" (⬤: a, b, c, . . . : small letters to follow $ (see FIG. 7 and FIG. 8)) after the identifier "#BLT" (S25). If there is the identifier "$⬤=" (S25, YES), the processing unit 200 stores the symbol string arranged with a predetermined relative positional relationship with the identifier "$⬤=" and the next symbol (identifier) "$", specifically, the symbol string from the identifier "$⬤=" to the next symbol (identifier) "$", as distribution information in the list of distribution information in the storage part 203 (S26). After this, the processing unit 200 runs a search toward the last symbol "$" in the region of "device name" of the response signal and judges if there is another identifier of the symbol string "$⬛=" (S27). Further, each time finding an identifier "$⬛=" (S27, YES), it stores the symbol string from the identifier "$⬛=" to the next symbol "$" as distribution information in the list of distribution information (S26).

If, in the process of the search of the symbol string of the response signal, the search reaches the final symbol "$" and it is judged there is no identifier "$⬛=" (S27, NO), the processing unit 200 notifies the application which is being run in parallel in the processing unit 200 that the distribution information (list of distribution information) has been updated (S28). After that, the processing unit 200 repeatedly runs the above-mentioned processing (S21 to S28). In the process, each time a response signal which is transmitted from the information distribution fixed station 10 for the search signal is received, the processing unit 200 acquires the distribution information which is contained in that response signal (S24 to S27: distribution information acquiring means) and notifies the application that the distribution information has been updated (S28).

Note that, when the received response signal does not include the identifier "#BLT" (S24, NO), it is judged to be a response signal from another BT slave side device. The processing unit 200 then does not perform the subsequent processing (S25 to S28) but confirms that the mobile information terminal 20 is in a moving state (S21, YES) and performs processing relating to transmission of the search signal of devices (S22). Further, when there is no identifier "$⬛=" after the identifier "#BLT" in the received response signal (S25, NO), it is deemed that no information is being distributed from the information distribution fixed station 10 and the processing unit 200 does not perform the subsequent processing (S26 to S28), but confirms that the mobile information terminal 20 is in a moving state (S21, YES) while performing processing relating to transmission of the search signal of devices (S22).

Due to the above-mentioned processing, the mobile information terminal 20, for example, receives a response signal containing distribution information in the "device name" region as shown in FIG. 7 and can acquire distribution information of the position information (corresponding to identifier "$a="), sensor information (corresponding to identifier "$b="), and URL (corresponding to identifier "$c=") from that response signal. Further, the application which is run in the mobile information terminal 20 can utilize the acquired position information and other distribution information.

In the above-mentioned such information distribution system, the framework of a wireless communication system which starts short range communications according to Bluetooth® protocols is utilized. The mobile information terminal 20 (BT wireless communication unit 210) constituted as the master side wireless communication apparatus transmits a search signal, then the information distribution fixed station 10 constituted as the slave side wireless communication apparatus transmits a response signal including position information or other distribution information not relating to establishment of connection in the region of the response signal for containing the "device name" which is predetermined as information which is required for establishment of connection, then the mobile information terminal 20 which receives that response signal acquires position information or other distribution information included in the response signal. Therefore, by the transmission and reception of the search signal and the transmission and reception of the response signal between the mobile information terminal 20 and the information distribution fixed station 10 before establishment of connection, position information and other distribution information not related to the establishment of connection can be sent from the information distribution fixed station 10 to the mobile information terminal 20 by short range communication according to Bluetooth™ protocols. In this way, the information distribution system does not require establishment of connection between the information distribution fixed station 10 and the mobile information terminal 20 when position information and other information is distributed from the former to the latter, so there is no need to transmit information required for security (PIN code, link key, etc) and use for distribution of information toward an unspecified large number of parties becomes easy.

In the processing relating to information acquisition according to the routine which is shown in FIG. 9 performed by a mobile information terminal 20, if the mobile information terminal 20 is placed on a desk etc. and is not in a moving state (S21, NO), substantive processing relating to information acquisition (S22 to S28) is not performed, so wasted processing relating to information acquisition need not be performed and the power consumption of the mobile information terminal 20 can be reduced. Note that, the processing according to the later routine shown in FIG. 9 (S22 to S28) was made to be performed conditional on the mobile information terminal being in a moving state (S21, YES), but the invention is not limited to this. For example, it is also possible to have the user perform a predetermined operation on the operating unit 202 to start the processing (S22 to S28).

Figure 10:
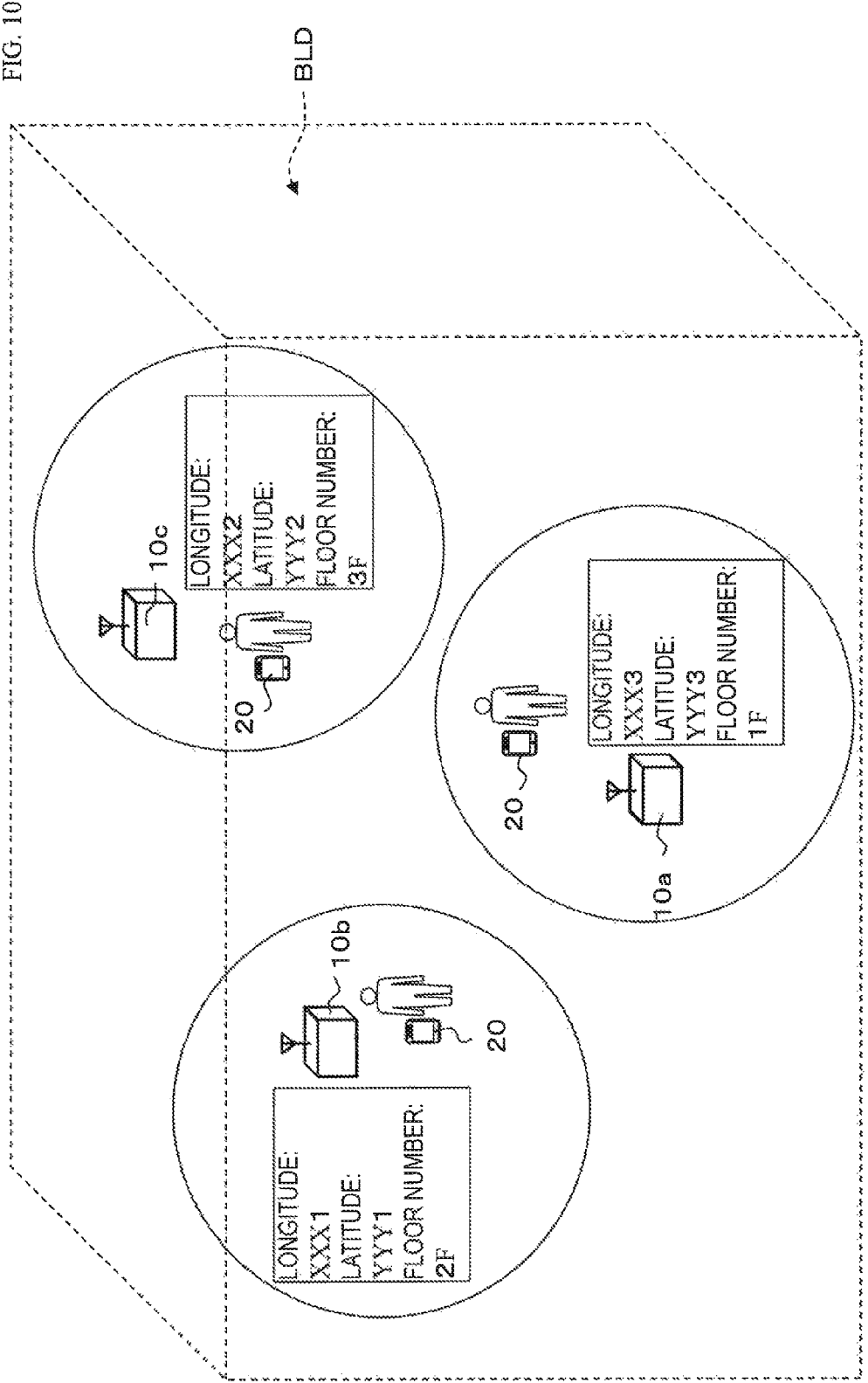
FIG. 10 is a view which shows an example of application of the information distribution system.

One example of application of the above-mentioned information distribution system will be shown in FIG. 10.

In FIG. 10, for example, a plurality of information distribution fixed stations 10a, 10b, and 10c are installed in a building BLD such as a shopping mall where information from a GPS satellite cannot be acquired. Note that, in FIG. 10, only three information distribution fixed stations 10a, 10b, and 10c are shown, but of course the number of information distribution fixed stations which are installed is not limited to this. Any number may be set. When a person holding a mobile information terminal 20 moves inside this building BLD (shopping mail etc.), if positioned near the information distribution fixed stations 10a, 10b, and 10c, position information indicating the position in the building BLD (longitude, latitude, floor number) is distributed from the information distribution fixed stations 10a, 10b, 10c to the mobile information terminal 20 in accordance with the above-mentioned routine (see FIG. 5 to FIG. 9).

Figure 11:
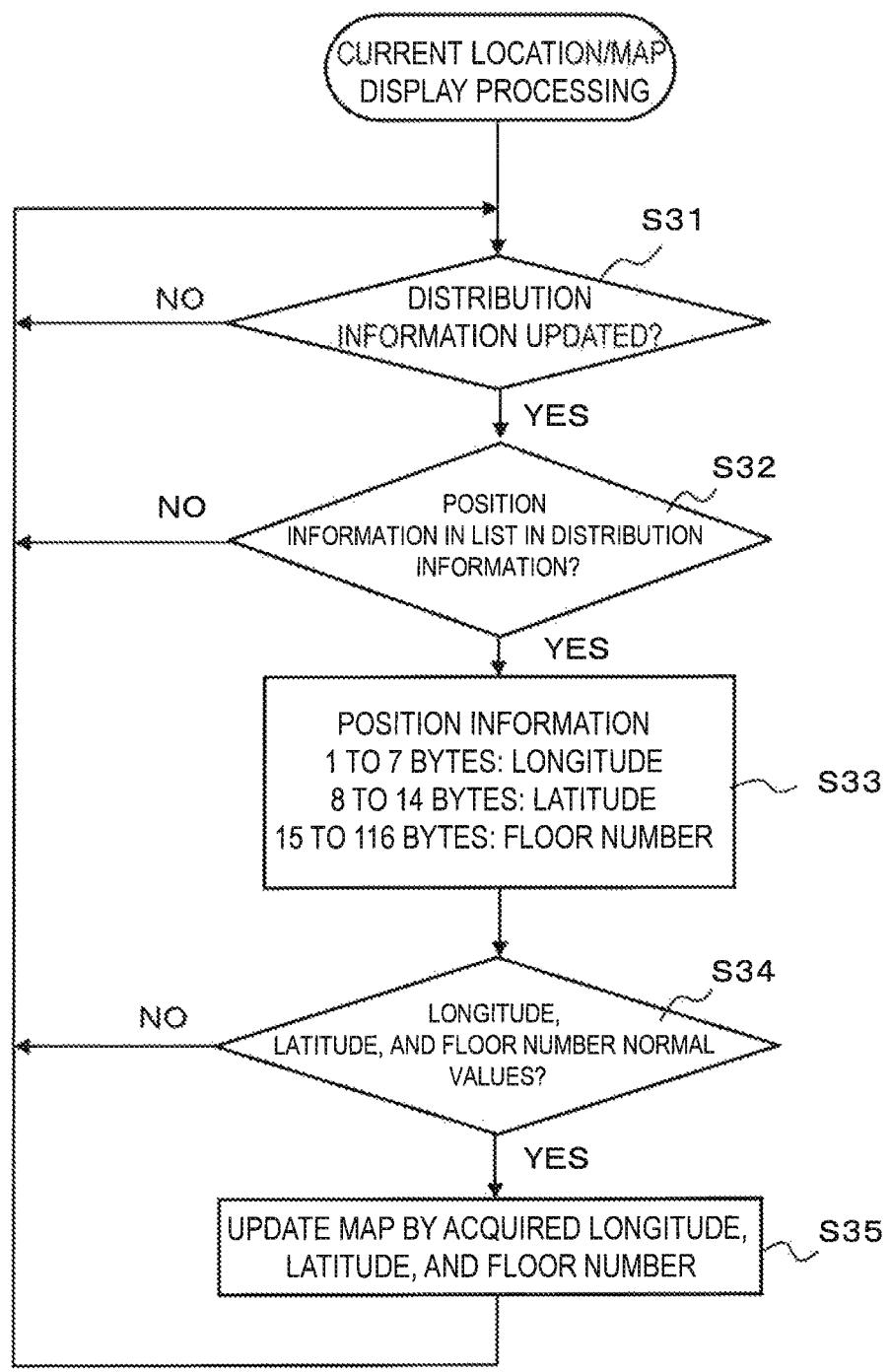
FIG. 11 is a flow chart which shows an example of the routine for processing distribution information at a mobile information terminal which acquires distribution information.

In the mobile information terminal 20 which acquires the position information, processing for display of a map which shows the position of location of the mobile information terminal 20 (person holding the same) in the building BLD is, for example, performed in accordance with the routine which is shown in FIG. 11.

In FIG. 11, the processing unit 200 of the mobile information terminal 20 (see FIG. 3) repeatedly judges if the distribution information has been updated (S31). If the processing unit 200 judges that the distribution information has been updated (S31, YES), it further judges if the list of distribution information (stored in storage part 203) contains position information (for example, corresponding to identifier "$a=" or identifier "$d=" (see FIG. 8)) (S32). If the list of distribution information contains position information (S32, YES), the processing unit 200 acquires the position information in the list of distribution information (S33). This position information (for example, 16 bytes) is comprised of the latitude (1 to 7 bytes), the longitude (8 to 14 bytes), and the floor number of the building BLD (15 to 16 bytes). If the processing unit 200 judges that the latitude, longitude, and floor number which are indicated by the acquired position information are not unusual values, but are normal values (S34, YES), the map which is displayed on the display unit 201 is updated so that a mark which indicates the position which is indicated by the acquired position information (latitude, longitude, floor number) is, for example, displayed at the center of the screen of the display unit 201 (S35). It is also possible to update the position of the mark which is displayed based on the position information on a map which is displayed in a fixed manner on the screen of the display unit 201.

After that, each time the distribution information is updated (S32, YES), the position information (latitude, longitude, and floor number) which is contained in the distribution information is used as the basis for display processing of a map indicating the position of location of the mobile information terminal 20 (owner) in the building BLD (S32 to S35). Note that, in the process, when the list of distribution information does not contain position information (S32, NO), it is deemed that position information is not being distributed. Further, when the position which is indicated by the position information is an unusual position (S34, NO), it is deemed that the position information is mistaken and substantive processing relating to map display is not performed.

In this example of application of the above-mentioned information distribution system, even in a building BLD where it is difficult to receive position information from a GPS satellite, it is possible to distribute position information B (longitude, latitude, and floor number) which indicates the accurate position inside the building BLD to a mobile information terminal 20. Due to this, the holder of the mobile information terminal 20 can easily learn the position of location inside the shopping mall or other building BLD and, further, can receive navigation information for example for going to a target store from the mobile information terminal 20. Furthermore, the position in the height direction from the ground, expressed by the floor number etc. in the building BLD, can also be distributed to the mobile information terminal 20, so the user can be provided with the 3D position.

Figure 12:
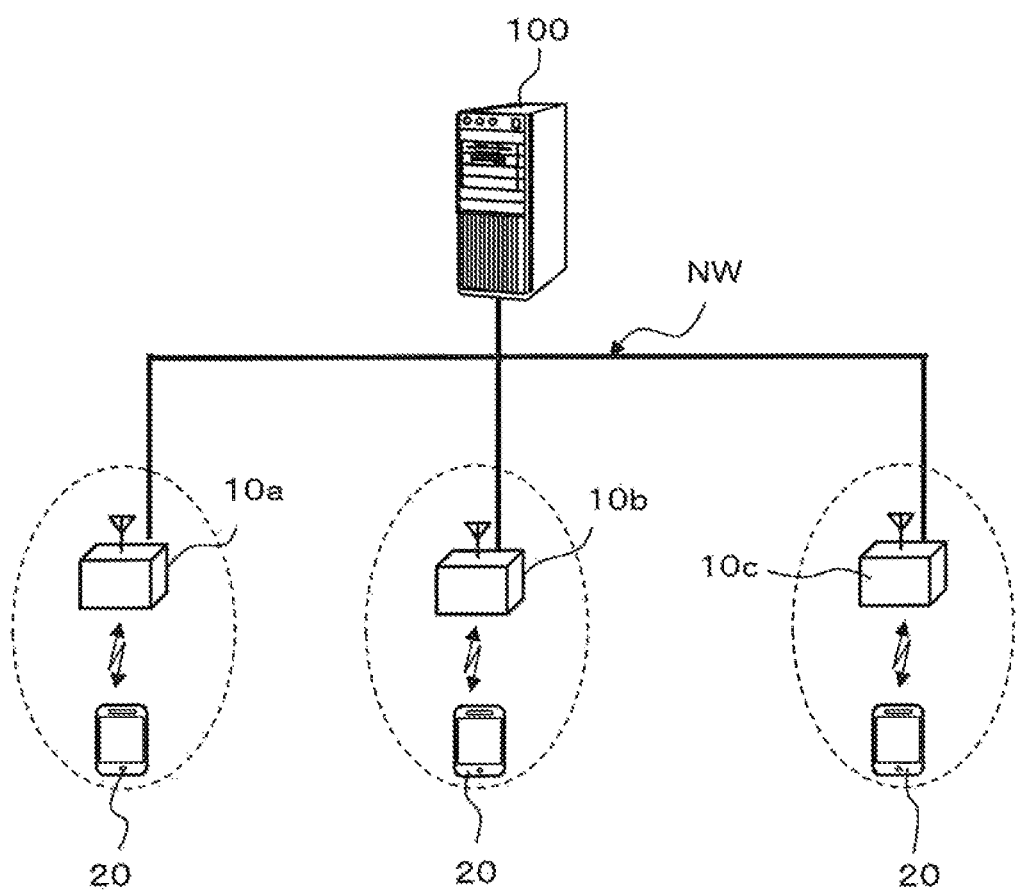
FIG. 12 is a view which shows another example of application of an information distribution system.

Another example of application of the above-mentioned information distribution system is shown in FIG. 12.

In FIG. 12, a plurality of information distribution fixed stations 10a, 10b, and 10c are connected through a network NW (part or all able to include a wireless network) to a distribution information managing server 100. The information distribution fixed stations 10a, 10b, and 10c insert the distribution information which is sent from the distribution information server 100 in the response signals and transmit the response signals to a mobile information terminal 20 which transmits a search signal. The mobile information terminal 20 can acquire distribution information managed by the distribution information managing server 100.

Figure 13:
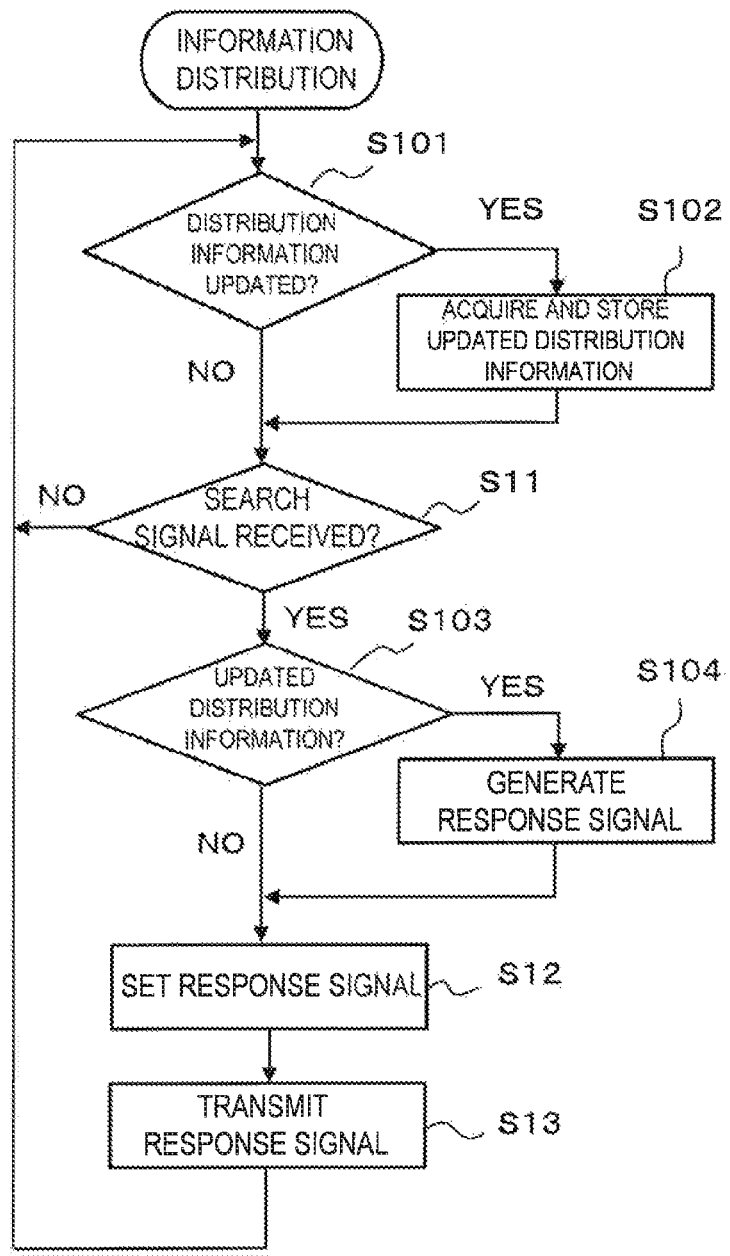
FIG. 13 is a flow chart which shows another routine of processing which is performed by the information distribution fixed station in the communication routine which is shown in FIG. 5.

In this case, the information distribution fixed stations 10a, 10b, and 10c run processing relating to information distribution in accordance with the routine which is shown in FIG. 13 instead of the routine which is shown in FIG. 6.

In FIG. 13, the control unit 15 of the information distribution fixed station 10 confirms if updated distribution information is provided from the distribution information managing server 100 (S101) and judges if a search signal from the mobile information terminal 20 constituted as the master side wireless communication apparatus has been received by the receiving part 11 (S11). If, in the process, updated new distribution information is provided from the distribution information managing server 100 (S101, YES), the control unit 15 acquires that updated distribution information and stores it in the storage part 17 (S102). In this state, if a search signal from the mobile information terminal 20 is received by the receiving part 11 (S11, YES), the control unit 15 judges if updated distribution information is stored in the storage part 17 (S103). If updated distribution information is stored in the storage part 17 (S103, YES), the control unit 15 prepares a response signal in which that updated distribution information is contained in the region of "device name" as explained above (see FIG. 7 and FIG. 8) (S104) and prepares (sets) the response signal as a signal to be transmitted (S12). Further, a response signal which includes that updated distribution information is transmitted to the mobile information terminal 20 constituted as the master side wireless communication apparatus (S13).

Note that, in the state where the distribution information managing server 100 has not provided updated distribution information (S101, NO, S103, NO), in the same way as the case which is shown in FIG. 6, each time the search signal is received (S11, YES), the response signal which contains the distribution information which is obtained at that point of time is set (S12) and is transmitted to the mobile information terminal 20 (S13).

Figure 14:
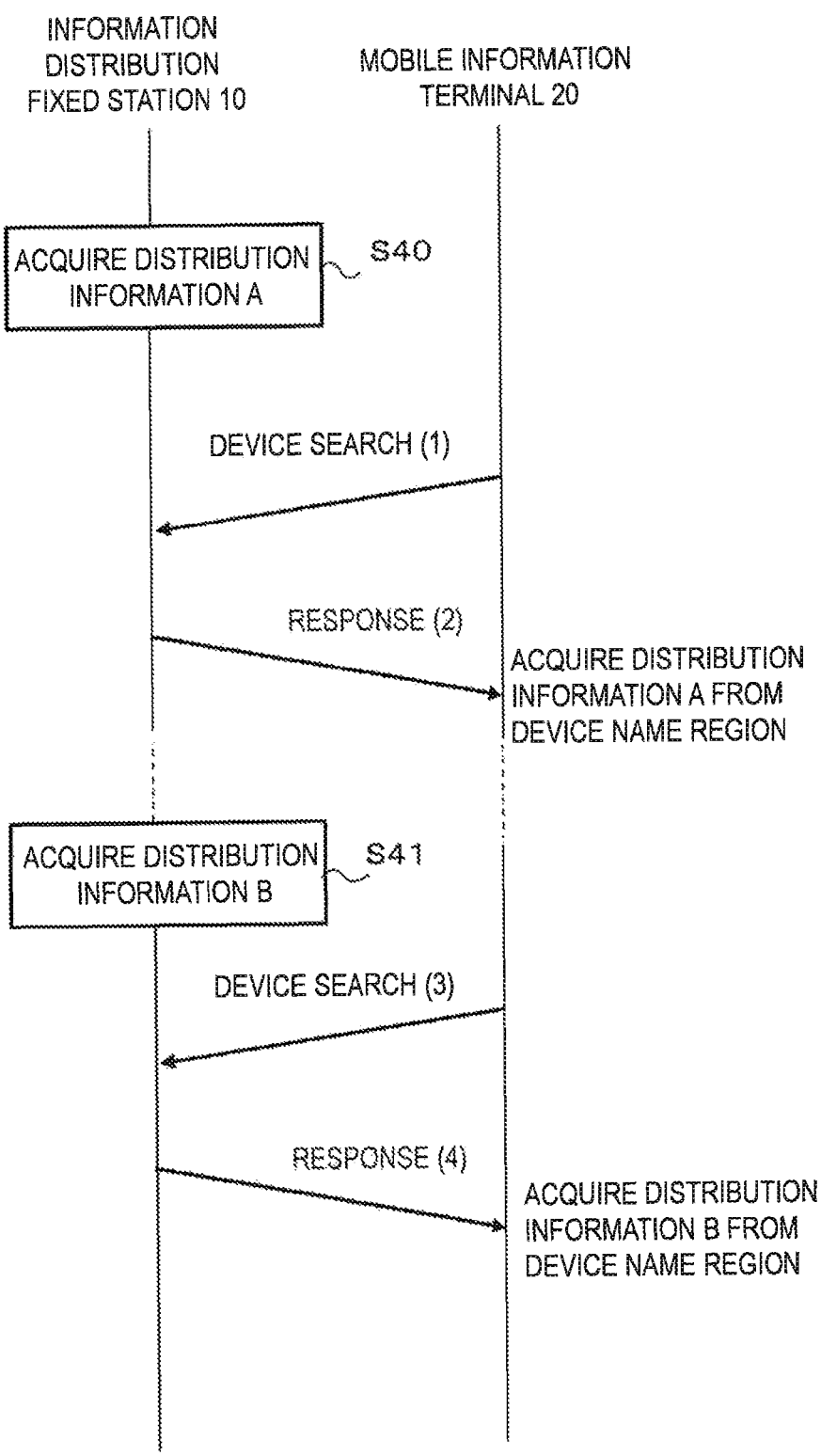
FIG. 14 is a sequence diagram which shows a communication routine which is performed between an information distribution fixed station and a mobile information terminal in the case where information which changes along with time is distributed in the information distribution system.

An information distribution fixed station 10 (10a, 10b, and 10c being referred to together using reference numeral 10) which transmits a response signal including the distribution information in accordance with the routine which is shown in FIG. 13 and a mobile information terminal 20 transmit and receive information with each other in accordance with the communication routine which is shown in FIG. 14.

In FIG. 14, if the information distribution fixed station 10 acquires distribution information A from the distribution information managing server 100 (S40), then a search signal which is transmitted from the mobile information terminal 20 (master side wireless communication apparatus) is received by the information distribution fixed station 10 (routine 1), a response signal which includes the distribution information A in the region of "device name" is transmitted from the information distribution fixed station 10 to the mobile information terminal 20 (routine 2). The mobile information terminal 20 can acquire the distribution information A which is included in the received response signal. After that, the distribution information which is provided from the distribution information managing server 100 is updated, and the information distribution fixed station 10 acquires distribution information B different from the distribution information A (S41). In that state, if a search signal which is transmitted from the mobile information terminal 20 is received by the information distribution fixed station 10 (routine 3), a response signal which includes the new distribution information B in the device name is transmitted from the information distribution fixed station 10 to the mobile information terminal 20 (routine 4). After that, the mobile information terminal 20 can acquire new distribution information B which is included in the received response signal.

In the above-mentioned example of application of the information distribution system (see FIG. 12 to FIG. 14), the distribution information which is managed all together at the distribution information managing server 100 can be distributed from a large number of information distribution fixed stations 10 to a large number of mobile information terminals 20. Further, the mobile information terminals 20 can acquire constantly updated, new distribution information.

Still another example of application of the above-mentioned information distribution system will be explained.

Figure 15:
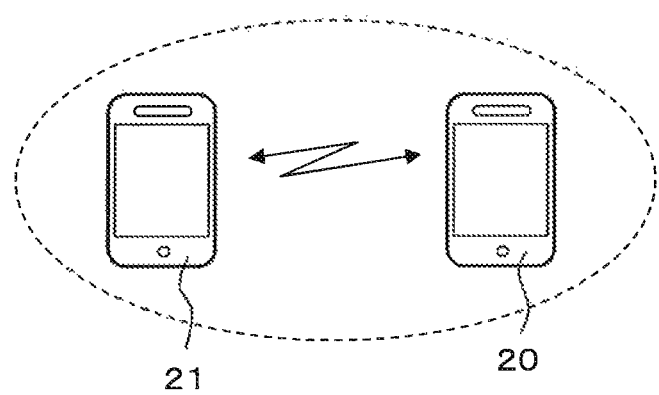
FIG. 15 is a view which shows another example of the basic configuration of the information distribution system.

In the system which is shown in FIG. 15, a mobile information terminal 20 and a mobile information terminal 21 can distribute information between them by short range communication in accordance with Bluetooth® protocols. The mobile information terminals 20 and 21 are configured as shown in FIG. 3 and have BT wireless communication units 210. For example, the mobile information terminal 20 functions as a master side wireless communication apparatus, while the mobile information terminal 21 functions as a slave side wireless communication apparatus. In such a system, the mobile information terminal 21 (BT wireless communication unit 210) which receives the search signal which is transmitted from the mobile information terminal 20 (BT wireless communication unit 210) in accordance with the communication routine which is shown in FIG. 5 transmits a response signal which includes the distribution information (see FIG. 6). Further, the mobile information terminal 20 which receives the response signal which is transmitted from the mobile information terminal 21 acquires the distribution information from the received response signal and utilizes that distribution information.

Figure 16A:
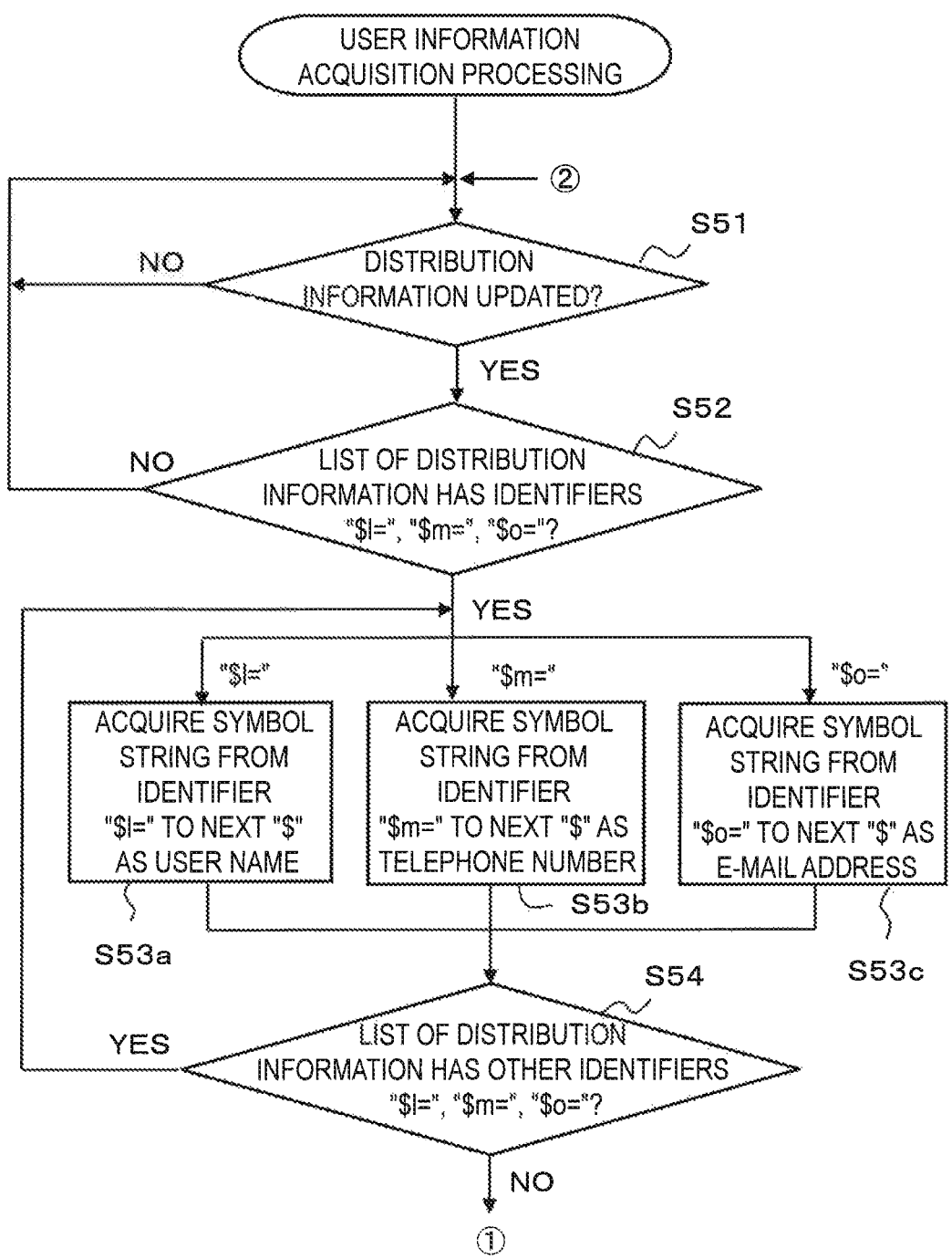
FIG. 16A is a flow chart which shows an example of the routine (part 1) for processing the distribution information in a mobile information terminal at a side receiving distribution information in the information distribution system which is shown in FIG. 15.
Figure 16B:
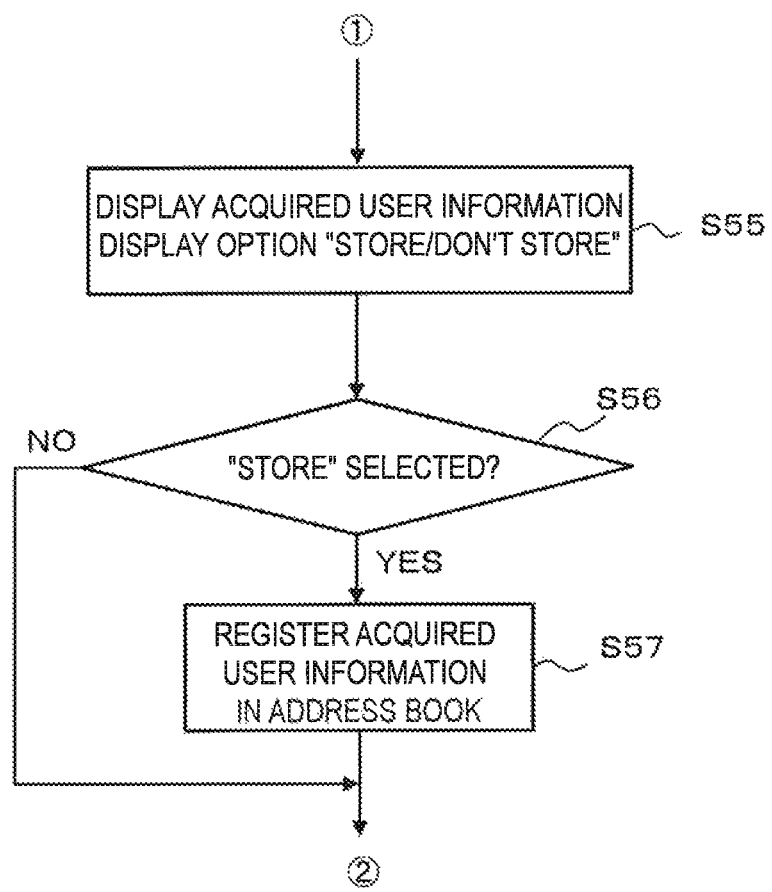
FIG. 16B is a flow chart which shows an example of the routine (part 2) for processing the distribution information in a mobile information terminal at a side receiving distribution information in the information distribution system which is shown in FIG. 15.

The mobile information terminal 20, for example, acquires the user information (user name, user telephone number, user e-mail address) as distribution information from the response signal which is transmitted from the mobile information terminal 21 according to the routine which is shown in FIG. 16A and FIG. 16B.

In FIG. 16A, if the processing unit 200 of the mobile information terminal 20 judges that the distribution information has been updated (S51, YES), it judges if the list of distribution information includes an identifier "$l=" corresponding to a user name, identifier "$m=" corresponding to a telephone number, and identifier "$o=" corresponding to an e-mail address (see FIG. 8) (S52). If the list of distribution information has the identifier "$l=", the processing unit 200 acquires the string of symbols from the identifier "$l=" to the next symbol "$" as the user name (S53a). Further, if the list of distribution information has the identifier "$m=", the processing unit 200 acquires the string of symbols from the identifier "$m=" to the next symbol "$" as the telephone number (S53b). Furthermore, if the list of distribution information has the identifier "$o=", the processing unit 200 acquires the string of symbols from the identifier "$o=" to the next symbol "$" as the e-mail address (S53c).

If the processing unit 200 acquires user information which includes at least one of the user name, telephone number, and e-mail address in the above way (S53a to S53c), it judges if the list of distribution information has identifiers which indicate other user information ("$l=", "$m=", "$o=") (S54). If it does, it acquires that user information (S53a to S53c). Further, if acquiring all of the user information from the list of distribution information (S54, NO), the processing unit 200 shifts to the processing of FIG. 16B where it makes the display unit 201 display the acquired user information and display select buttons for storing or not storing that user information (555). If the user operates the "store" select button (S56, YES), the processing unit 200 registers the acquired user information in the address book at the storage part 203 (557). On the other hand, if the user operates the "do not store" select button (S56, NO), the processing unit 200 erases the user information which is displayed at the display unit 201 and returns to a state where it confirms if the initial distribution information has been updated without registering the user information (FIG. 16A, S51).

According to the example of application of the information distribution system such as explained above, information is not distributed toward an unspecified large number of other parties. User information and other information can be distributed between a mobile information terminal 20 and a mobile information terminal 21 which individuals hold. At that time, there is no need to establish connection between the mobile information terminal 20 and the mobile information terminal 21. It is possible to more simply distribute user information and other information. However, if there are a large number of master side wireless communication apparatuses constituted by mobile information terminals like the mobile information terminal 20 present nearby a slave side wireless communication apparatus constituted by the mobile information terminal 21, it is possible to distribute information (user information) from the mobile information terminal 21 to a plurality of mobile information terminals.

Figure 17:
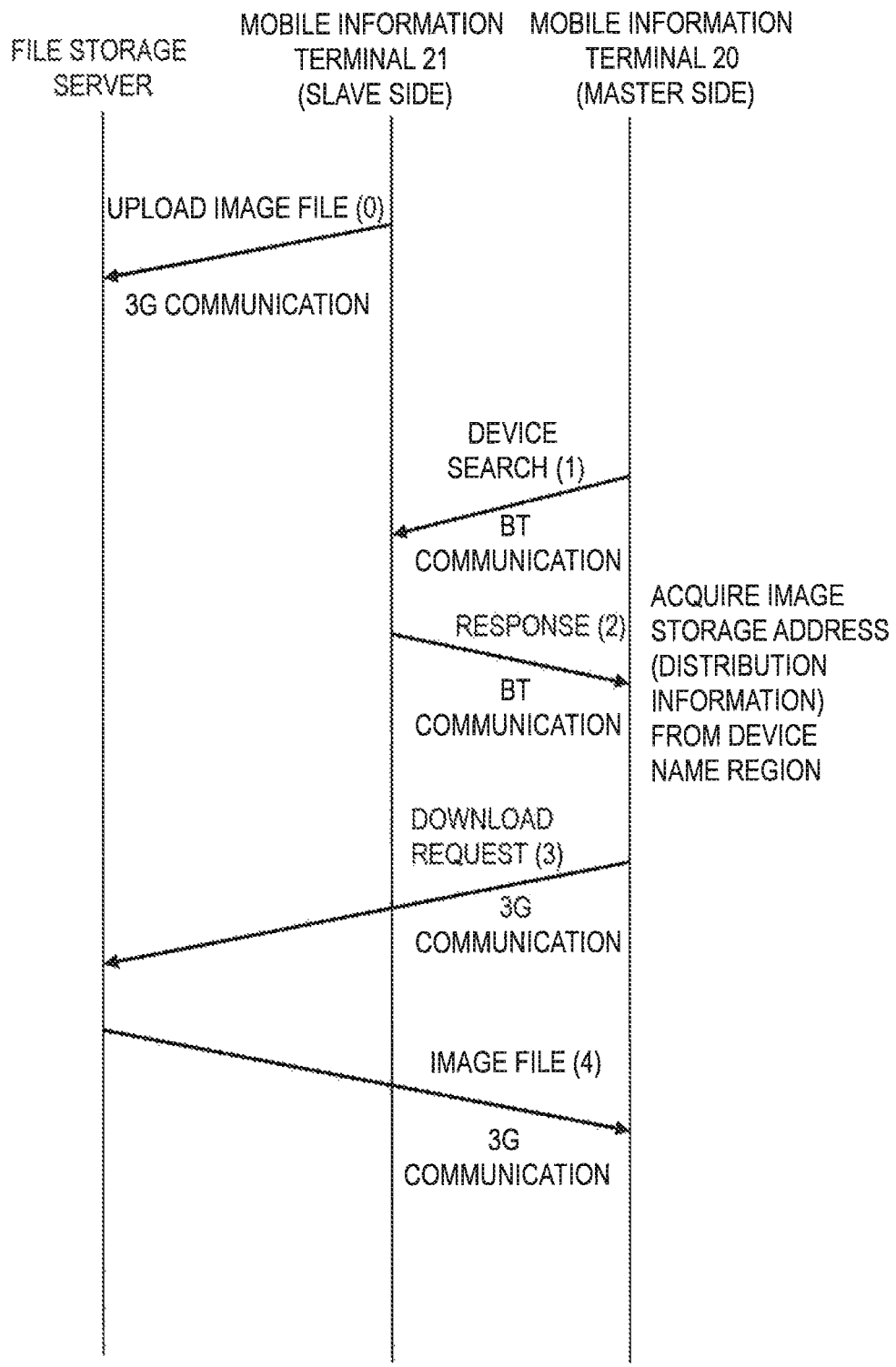
FIG. 17 is a sequence diagram which shows one example of the communication routine which is performed between a mobile information terminal at a side transmitting distribution information and a mobile information terminal at a side receiving the distribution information in the information distribution system which is shown in FIG. 15.

In the above example of application of the information distribution system (see FIG. 15), information can be distributed (information can be acquired) in accordance with the communication routine which is shown in FIG. 17.

In FIG. 17, the mobile information terminal 21, for example, uses a 3G mobile communication unit 220 to upload an image file to a file storage server on the Internet (routine 0). In this state, the device search signal which is transmitted from the BT wireless communication unit 210 (see FIG. 3) of the mobile information terminal 20 constituted as the master side wireless communication apparatus is received by the BT wireless communication unit 210 (see FIG. 3) of the mobile information terminal 21 constituted as the slave side wireless communication apparatus (routine 1). This being so, the mobile information terminal 21 (BT wireless communication unit 210) transmits a response signal including the URL indicating the location of storage of the image file in the file storage server (including image storage address information) in the "device name" region (routine 2).

The mobile information terminal 20 acquires the URL (including image storage address) from the response signal which was received from the BT wireless communication unit 210 and uses the 3G mobile communication unit 220 to request download from the file storage server on the Internet which is specified by the URL (routine 3). Further, the mobile information terminal 20 (3G mobile communication unit 220) downloads the image file from the file storage server in accordance with the download request (routine 4). The mobile information terminal 20 can use the image file which was downloaded from the file storage server as the basis for displaying an image on the display unit 201 or otherwise utilizing the image file.

The above-mentioned information distribution system utilized a wireless communication system (including a master side wireless communication apparatus and slave side wireless communication apparatus) for performing short range communication in accordance with Bluetooth® protocols, but is not limited to this. It can be utilized so long as "a wireless communication system wherein a master side wireless communication apparatus and a slave side wireless communication apparatus start short range wireless communication in accordance with a procedure in which the master side wireless communication apparatus transmits a search signal, the slave side wireless communication apparatus performs a stand-by operation for a search signal, and the slave side wireless communication apparatus which receives the search signal, transmits a response signal including information which is predetermined as information required for establishment of connection with the master side wireless communication apparatus to the master side wireless communication apparatus".

The information which is distributed is not limited to the information which is shown in FIG. 7 and FIG. 8. Further, the format whereby that distribution information is included in the response signal is also not limited to that shown in FIG. 7 and can be freely determined.

Further, the region including the distribution information is also not limited to the region of "device name" of the response signal and need only be a region which should contain information which is predetermined as information which is required for establishment of connection between the master side wireless communication apparatus and the slave side wireless communication apparatus. Further, the region of the "device name" of the response signal included both the distribution information and the device name itself, but the device name itself need not be included. In general, the region of the response signal for containing information which is predetermined as information which is required for establishment of connection need only contain the distribution information and need not contain the information which is predetermined as information which is required for establishment of connection itself.

Note that, a mobile information terminal 20 (for example, Smartphone) constituted as the master side wireless communication apparatus can download a program for receiving information distribution from a predetermined site on the Internet by, for example, the 3G mobile communication unit 220 as a single application software. Further, the program for receiving the information distribution can be included as part of the application software which utilizes that distribution information (for example, above-mentioned application displaying position of location on map or providing navigation). Furthermore, the mobile information terminal 21 constituted as the slave side wireless communication apparatus in the example of application such as shown in FIG. 15 as well, the program for information distribution can be downloaded from a predetermined site on the Internet as a single application software.

INDUSTRIAL APPLICABILITY

As explained above, the information distribution system according to the present invention can easily distribute information toward an unspecified large number of parties even if utilizing short range wireless communication and is useful as an information distribution system which distributes information by short range wireless communication.

REFERENCE SIGNS LIST 10 information distribution fixed station (second wireless communication apparatus)
11 receiving part
12 transmitting part
13 reception signal processing part
14 transmission signal processing part
15 control unit
16 reference signal generating part
17 storage part
20 mobile information terminal (first wireless communication apparatus)
21 mobile information terminal (second wireless communication apparatus)
100 distribution information managing server
200 processing unit
201 display unit
202 operating unit
203 storage part
210 BT wireless communication unit
220 3G mobile communication unit

The invention claimed is:

1. An information distribution system utilizing a wireless communication system wherein a master side wireless communication apparatus and a slave side wireless communication apparatus start short range wireless communication in accordance with a procedure in which said master side wireless communication apparatus transmits a search signal, said slave side wireless communication apparatus performs a stand-by operation for the search signal, and said slave side wireless communication apparatus which receives the search signal transmits a response signal including information which is predetermined as information required for establishment of connection with said master side wireless communication apparatus to said master side wireless communication apparatus, said information distribution system comprising:

a first wireless communication apparatus which is constituted as said master side wireless communication apparatus; and a second wireless communication apparatus which is constituted as said slave side communication apparatus and which transmits the response signal including distribution information not related to the establishment of connection with said master side wireless communication apparatus in a region for containing the information which is predetermined as the information required for the establishment of connection with said master side wireless communication apparatus when said second wireless communication apparatus receives the search signal transmitted from said first wireless communication apparatus.

2. The information distribution system according to claim 1 wherein said second wireless communication apparatus constituted as said slave side wireless communication apparatus transmits the response signal including identification information which is arranged with a predetermined relative positional relationship to the distribution information in the region of the response signal.

3. The information distribution system according to claim 2 wherein said first wireless communication apparatus constituted as said master side wireless communication apparatus detects the identification information from the received response signal and acquires information, as the distribution information, which is arranged with the predetermined relative positional relationship to the identification information in the response signal.

4. The information distribution system according to claim 1 which uses as said wireless communication system a wireless communication system which starts the short range wireless communication in accordance with Bluetooth® protocols.

5. The information distribution system according to claim 4 wherein said second wireless communication apparatus constituted as said slave side wireless communication apparatus transmits the response signal including the distribution information in the region for containing information relating to a device name which is predetermined as the information required for the establishment of connection with said master side wireless communication apparatus.

6. The information distribution system according to claim 5 wherein said first wireless communication apparatus constituted as said master side wireless communication apparatus acquires the distribution information from the region of the response signal for containing the information which relates to the device name.

7. The information distribution system according to claim 1 wherein after said first wireless communication apparatus receives the response signal, the establishment of connection between said first wireless communication apparatus constituted as said master side wireless communication apparatus and said second wireless communication apparatus constituted as said slave side wireless communication apparatus is not performed.

8. A wireless communication apparatus constituted as a slave side wireless communication apparatus in a wireless communication system wherein a master side wireless communication apparatus and said slave side wireless communication apparatus start short range wireless communication in accordance with a procedure in which said master side wireless communication apparatus transmits a search signal, said slave side wireless communication apparatus performs a stand-by operation for the search signal, and said slave side wireless communication apparatus which receives the search signal transmits a response signal including information which is predetermined as information required for establishment of connection with said master side wireless communication apparatus to said master side wireless communication apparatus, said wireless communication apparatus comprising:

response signal setting means for preparing the response signal including distribution information not related to the establishment of connection with said master side wireless communication apparatus in a region for containing the information which is predetermined as the information required for the establishment of connection with said master side wireless communication apparatus when the search signal from said master side wireless communication apparatus is received by a receiving part, and response signal transmission control means for making a transmitting part transmit the response signal which is prepared by said response signal setting means.

9. The wireless communication apparatus according to claim 8 wherein said response signal setting means prepares the response information including identification information which is arranged with a predetermined relative positional relationship to the distribution information in the region of the response signal.

10. The wireless communication apparatus according to claim 8 which starts the short range wireless communication with said master side wireless communication apparatus in accordance with Bluetooth® protocols.

11. The wireless communication apparatus according to claim 10 wherein said response signal setting means prepares the response signal including the distribution information in the region for containing information relating to a device name which is predetermined as the information required for the establishment of connection with said master side wireless communication apparatus.

12. The wireless communication apparatus according to claim 8 which does not perform the establishment of connection with said master side wireless communication apparatus after the response signal is transmitted by said transmitting part.

13. A wireless communication apparatus constituted as a master side wireless communication apparatus in a wireless communication system wherein said master side wireless communication apparatus and a slave side wireless communication apparatus start short range wireless communication in accordance with a procedure in which said master side wireless communication apparatus transmits a search signal, said slave side wireless communication apparatus performs a stand-by operation for the search signal, and said slave side wireless communication apparatus which receives the search signal transmits a response signal including information which is predetermined as information required for establishment of connection with said master side wireless communication apparatus to said master side wireless communication apparatus, said wireless communication apparatus comprising:

distribution information acquiring means for acquiring distribution information not related to the establishment of connection with said slave side wireless communication apparatus from a region of the response signal for containing information which is predetermined as the information required for the establishment of the connection with said slave side wireless communication apparatus when a transmitting part transmits the search signal, then a receiving part receives the response signal.

14. The wireless communication apparatus according to claim 13 wherein the response signal includes identification information which is arranged with a predetermined relative positional relationship to the distribution information in the region, and wherein said distribution information acquiring means detects the identification information from the response signal and acquires information, as the distribution information, which is arranged with the predetermined relative positional relationship to the identification information in the response signal.

15. The wireless communication apparatus according to claim 13 which starts the short range wireless communication with said slave side wireless communication apparatus in accordance with Bluetooth® protocols.

16. The wireless communication apparatus according to claim 15 wherein the response signal includes the distribution information in a region for containing information which relates to a device name which is predetermined as information required for the establishment of connection with said master side wireless communication apparatus, and wherein said distribution information acquiring means acquires the distribution information from the region of the response signal for containing the information which relates to the device name.

17. The wireless communication apparatus according to claim 13 wherein after the response signal is received by said receiving part, the establishment of connection with said slave side wireless communication apparatus is not performed.

18. A program for making a computer perform processing in a wireless communication apparatus constituted as a slave side wireless communication apparatus in a wireless communication system wherein a master side wireless communication apparatus and said slave side wireless communication apparatus start short range wireless communication in accordance with a procedure in which said master side wireless communication apparatus transmits a search signal, said slave side wireless communication apparatus performs a stand-by operation for the search signal, and said slave side wireless communication apparatus which receives the search signal transmits a response signal including information which is predetermined as information required for establishment of connection with said master side wireless communication apparatus to said master side wireless communication apparatus, said program making said computer perform a response signal setting step of preparing the response signal including distribution information not related to the establishment of connection with said master side wireless communication apparatus in a region for containing the information which is predetermined as the information required for the establishment of the connection with said master side wireless communication apparatus when the search signal from said master side wireless communication apparatus is received by a receiving part, and a response signal transmission control step of making a transmitting part transmit the response signal which is prepared by said response signal setting step.

19. The program according to claim 18 wherein said response signal setting step prepares the response information including identification information which is arranged with a predetermined relative positional relationship to the distribution information in the region of the response signal.

20. The program according to claim 18 which makes said computer perform processing in said wireless communication apparatus which starts short range wireless communication with said master side wireless communication apparatus in accordance with Bluetooth® protocols.

21. The program according to claim 20 wherein said response signal setting step prepares the response signal including the distribution information in the region for containing information relating to a device name which is predetermined as the information required for the establishment of connection with said master side wireless communication apparatus.

22. A program for making a computer perform processing in a wireless communication apparatus constituted as a master side wireless communication apparatus in a wireless communication system wherein said master side wireless communication apparatus and a slave side wireless communication apparatus start short range wireless communication in accordance with a procedure in which said master side wireless communication apparatus transmits a search signal, said slave side wireless communication apparatus performs a stand-by operation for the search signal, and said slave side wireless communication apparatus which receives the search signal transmits a response signal including information which is predetermined as information required for establishment of connection with said master side wireless communication apparatus to said master side wireless communication apparatus, said program making said computer perform a distribution information acquiring step of acquiring distribution information not related to the establishment of connection with said slave side wireless communication apparatus from a region of the response signal for containing information which is predetermined as the information required for the establishment of the connection with said slave side wireless communication apparatus when a transmitting part transmits the search signal, then a receiving part receives the response signal.

23. The program according to claim 22 wherein the response signal includes identification information which is arranged with a predetermined relative positional relationship to the distribution information in the region, and wherein said distribution information acquiring step detects the identification information from the response signal and acquires information, as the distribution information, which is arranged with the predetermined relative positional relationship to the identification information in the response signal.

24. The program according to claim 22 which makes said computer perform processing in said wireless communication apparatus which starts the short range wireless communication with said slave side wireless communication apparatus in accordance with Bluetooth® protocols.

25. The program according to claim 24 wherein the response signal includes the distribution information in a region for containing information which relates to a device name which is predetermined as information required for the establishment of connection with said master side wireless communication apparatus, and wherein said distribution information acquiring step acquires the distribution information from the region of said response signal for containing the information which relates to the device name.

\* \* \* \* \*